(12) United States Patent
Tasiopoulos et al.

(10) Patent No.: US 10,279,647 B2
(45) Date of Patent: May 7, 2019

(54) INTEGRATED THERMAL MANAGEMENT SYSTEM

(71) Applicant: Hanon Systems, Daejeon (KR)

(72) Inventors: James Tasiopoulos, Saint Clair Shores, MI (US); Alex Dziubinschi, Dearborn, MI (US); John Meyer, Northville, MI (US)

(73) Assignee: HANON SYSTEMS, Daejeon (KR)

( * ) Notice: Subject to any disclaimer, the term of this patent is extended or adjusted under 35 U.S.C. 154(b) by 50 days.

(21) Appl. No.: 15/212,355

(22) Filed: Jul. 18, 2016

(65) Prior Publication Data

US 2017/0274727 A1    Sep. 28, 2017

Related U.S. Application Data

(60) Provisional application No. 62/312,159, filed on Mar. 23, 2016.

(51) Int. Cl.
*B60H 1/00* (2006.01)
*B60H 1/32* (2006.01)

(52) U.S. Cl.
CPC ..... *B60H 1/00271* (2013.01); *B60H 1/00921* (2013.01); *B60H 1/323* (2013.01);
(Continued)

(58) Field of Classification Search
CPC ............ B60H 1/00271; B60H 1/00921; B60H 1/3223
(Continued)

(56) References Cited

U.S. PATENT DOCUMENTS 4,607,497 A * 8/1986 Ferdows ............ B60H 1/00371
165/249
5,046,327 A * 9/1991 Walker ................ B60H 1/3222
165/42
(Continued)

FOREIGN PATENT DOCUMENTS

DE 102012108043 A1 * 5/2014 ................ F01P 3/20
DE 112013004048 T5 5/2015
(Continued)

OTHER PUBLICATIONS

JP2009291008A Machine Translation English—Retrieved Nov. 2017.*
(Continued)

*Primary Examiner* — Cassey D Bauer
*Assistant Examiner* — Jenna M Hopkins
(74) *Attorney, Agent, or Firm* — Shumaker, Loop & Kendrick, LLP; James D. Miller

(57) ABSTRACT

A thermal management system for a vehicle includes an enclosure containing an air-handling unit, a first circuit, a second circuit, and a control interface module. The air-handling unit includes a housing and a variable speed blower configured to provide a flow of air through the housing. The first circuit includes a compressor, a condenser in thermal communication with the air-handling unit, a receiver-drier, an expansion valve, and a chiller, in series. The second circuit includes a first loop including the chiller of the first circuit, a second loop including a radiator in thermal communication with the air-handling unit, and a third loop including a heater. The control interface module is configured to control each of the air-handling unit, the first circuit, and the second circuit.

10 Claims, 4 Drawing Sheets

(52) U.S. Cl.
CPC .............. *B60H 2001/00928* (2013.01); *B60H 2001/00949* (2013.01)

(58) Field of Classification Search
USPC ............................................ 165/202, 42, 41
See application file for complete search history.

(56) References Cited

U.S. PATENT DOCUMENTS

| | | | | |
|---|---|---|---|---|
| 5,222,373 | A * | 6/1993 | Waldschmidt | B60H 1/00014 |
| | | | | 62/239 |
| 6,742,343 | B2 * | 6/2004 | Matonog | B60H 1/00264 |
| | | | | 62/239 |
| 7,254,956 | B2 * | 8/2007 | Matonog | B60H 1/00264 |
| | | | | 62/239 |
| 9,233,593 | B2 * | 1/2016 | Beschieru | B60H 1/00278 |
| 2002/0043413 | A1 * | 4/2002 | Kimishima | B60H 1/323 |
| | | | | 180/68.1 |
| 2009/0280395 | A1 * | 11/2009 | Nemesh | B60H 1/00278 |
| | | | | 429/62 |
| 2009/0317697 | A1 * | 12/2009 | Dogariu | B60H 1/00278 |
| | | | | 429/62 |
| 2011/0146317 | A1 | 6/2011 | Cline et al. | |
| 2013/0298583 | A1 * | 11/2013 | O'Donnell | H01M 6/5038 |
| | | | | 62/115 |
| 2014/0034287 | A1 | 2/2014 | Buford et al. | |
| 2015/0032318 | A1 | 1/2015 | Gao | |
| 2015/0052913 | A1 * | 2/2015 | Smith | B60H 1/04 |
| | | | | 62/79 |
| 2015/0101789 | A1 * | 4/2015 | Enomoto | B60H 1/00485 |
| | | | | 165/202 |
| 2015/0308719 | A1 * | 10/2015 | Gebbie | B60H 1/00921 |
| | | | | 62/71 |
| 2016/0023539 | A1 * | 1/2016 | Johnson, Sr. | B60H 1/005 |
| | | | | 62/118 |
| 2016/0090958 | A1 * | 3/2016 | Berkson | B60H 1/00978 |
| | | | | 701/112 |
| 2016/0153343 | A1 * | 6/2016 | Kakehashi | B60H 1/00885 |
| | | | | 123/41.31 |
| 2016/0297283 | A1 * | 10/2016 | Sakamoto | F25B 47/02 |
| 2017/0282676 | A1 * | 10/2017 | Janier | B60H 1/00278 |

FOREIGN PATENT DOCUMENTS

| | | | |
|---|---|---|---|
| DE | 102016118688 A1 | 6/2017 | |
| GB | 2523264 A * | 8/2015 | ............ B60H 1/004 |
| JP | 2009291008 A * | 12/2009 | |
| JP | 2013110851 | 6/2013 | |
| JP | WO 2014034061 A1 * | 3/2014 | ......... B60H 1/00878 |
| JP | WO 2014162702 A1 * | 10/2014 | ......... B60H 1/00385 |
| JP | WO 2015136768 A1 * | 9/2015 | ............... F25B 7/00 |
| WO | 2015136768 A1 | 9/2015 | |

OTHER PUBLICATIONS

WO2015136768 Machine Translation English—Retrieved Nov. 2017.*
DE102012108043A1 Machine Translation (Retrieved Nov. 2018) (Year: 2012).*

* cited by examiner

INTEGRATED THERMAL MANAGEMENT SYSTEM

CROSS-REFERENCES TO RELATED APPLICATIONS

This patent application claims priority to U.S. Provisional Patent Application Ser. No. 62/312,159 filed on Mar. 23, 2016, the disclosure of which is incorporated herein by reference in its entirety.

FIELD OF THE INVENTION

The invention relates generally to an integrated system for managing thermal energy in vehicle electronics, and more particularly, to a thermal management system for electronics in an autonomous vehicle.

BACKGROUND

Traditionally, thermal management of vehicle electronic devices is accomplished via a primary heating, ventilation, and air-conditioning (HVAC) system, wherein a heating and cooling capacity that is primarily intended for a controlling a climate within a passenger compartment may be redirected to control a temperature of auxiliary systems such as the electronic devices. However, demands for improved vehicle efficiency have driven reductions in size, weight, and energy consumption of vehicle HVAC systems, wherein the vehicle HVAC systems are optimized to accommodate the thermal management requirements of the vehicle passenger compartment without concern for auxiliary thermal management requirements.

In recent years, electronics have become increasingly prevalent in vehicles for operation of various vehicle systems. Particularly, modern vehicles are being developed with advanced navigation systems capable of providing autonomous operation. Autonomous vehicles include a plethora of electronic devices, including sensors, processors, controllers, and transmitters which collect, process, and communicate information relating to navigation of the vehicle. As a byproduct to normal operation, many of the electronic devices generate a substantial amount of thermal energy, which must be managed to prevent overheating of the electronic devices.

Thus, there are competing interests in vehicle design, wherein demands for improved vehicle efficiency are driving reductions and optimization of primary vehicle HVAC systems, while a proliferation of vehicle electronics has increased a demand for thermal management capacity in a motor vehicle.

Accordingly, there is a need in the art for a dedicated thermal management system which is independent of the primary HVAC system configured to provide dedicated thermal management to vehicle electronic devices.

SUMMARY OF THE INVENTION

In concordance with the instant disclosure, a dedicated thermal management system which is independent of a primary HVAC system configured to provide dedicated thermal management to vehicle electronic devices is surprisingly discovered.

A first embodiment of the thermal management system for a vehicle includes an enclosure containing an air-handling unit, a first circuit, a second circuit, and a control interface module. The air-handling unit includes a housing and a variable speed blower configured to draw a flow of air through the housing. The first circuit includes a compressor, a condenser in thermal communication with the air-handling unit, a receiver-drier, an expansion valve, and a chiller, in series. The second circuit includes a first loop including the chiller of the first circuit, a second loop including a radiator in thermal communication with the flow of air through the air-handling unit, and a third loop including a heater. The control interface module is configured to control each of the air-handling unit, the first circuit, and the second circuit.

Another embodiment of the disclosure includes a method of managing thermal energy of electronic devices in a vehicle. The method includes configuring a thermal management system in one of a high-cooling mode, a low-cooling mode, and a heating mode. In the high-cooling mode the thermal management system is configured to provide a maximized removal rate of thermal energy from the electronic devices. Each of an air-handling unit and a first circuit is activated, and a first loop of a second circuit is opened to provide direct thermal communication between the first circuit and the second circuit. In the low-cooling mode the thermal management system is configured to facilitate a second thermal energy removal rate less than the maximized thermal energy removal rate. The air-handling unit is activated, the first circuit is deactivated, and a second loop of the second circuit is opened to provide thermal communication between a flow of air through the air-handling unit and the second circuit. In the heating mode, the thermal management system is configured to facilitate an addition of thermal energy to the electronic devices. The air-handling unit and the first circuit are deactivated, and a third loop of the second circuit is opened. A heater disposed in the third loop is activated.

In yet another embodiment, a thermal management system for a vehicle comprises a first circuit and a second circuit. The first circuit includes a condenser disposed within an air-handling unit and a chiller disposed downstream of the condenser with respect to a flow of a first heat transfer fluid through the first circuit. The second circuit includes a first loop, a second loop, and a third loop. The first loop includes the chiller and is in thermal communication with the first circuit through the chiller. The second loop includes a radiator disposed in the air-handling unit. The third loop bypasses each of the condenser and the chiller. A flow through each of the first loop, the second loop, and the third loop is selectively controlled by a first multi-direction valve.

BRIEF DESCRIPTION OF THE DRAWINGS

The above, as well as other advantages of the present disclosure, will become readily apparent to those skilled in the art from the following detailed description, particularly when considered in the light of the drawings described hereafter.

DETAILED DESCRIPTION OF THE INVENTION

Figure 1:
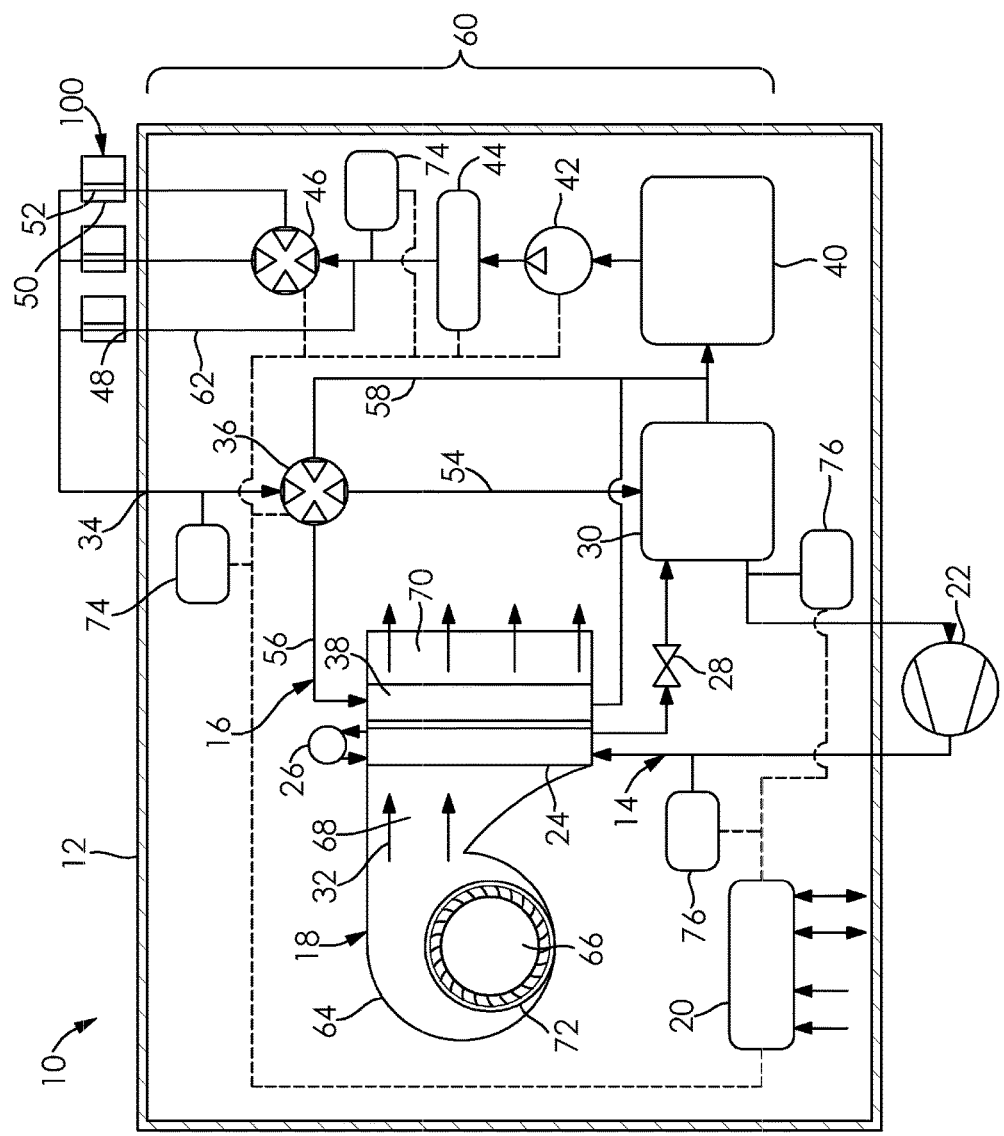
FIG. 1 is a schematic diagram illustrating an embodiment of an integrated thermal management system according to the instant disclosure.

The following detailed description and appended drawings describe and illustrate various embodiments of the invention. The description and drawings serve to enable one skilled in the art to make and use the invention, and are not intended to limit the scope of the invention in any manner. In respect of the methods disclosed, the steps presented are exemplary in nature, and thus, the order of the steps is not necessary or critical. For illustrative purposes, active fluid circuits are symbolized in the drawings by solid lines, while inactive fluid circuits are symbolized by dotted lines. Electrical communication circuits are shown as dashed lines.

As shown in FIGS. 1-4, a thermal management system 10 is provided for thermal management of electronic devices 100 in a vehicle. The system 10 includes an enclosure 12 having a first circuit 14 and a second circuit 16 disposed at least partially therein. The enclosure 12 further includes an air-handling unit 18 and a control interface module 20 disposed therein.

In the illustrated embodiment, each of the first circuit 14 and the second circuit 16 is configured for circulating a heat transfer fluid. In particular, the first circuit 14 circulates a first heat transfer fluid, such as a conventional refrigerant like R134a, R152a, and $CO_2$, for example. The second circuit 16 is configured to exchange thermal energy with the electronic devices 100, and circulates a second heat transfer fluid such as glycol, for example. It will be appreciated by those skilled in the art that other suitable heat transfer fluids may be circulated by either one of the first circuit 14 and the second circuit 16.

The first circuit 14 of the system 10 includes a compressor 22, a condenser 24, a receiver-drier 26, an expansion valve 28, and a chiller 30, all arranged in series. As shown, the compressor 22 is an electrically driven compressor 22, and is powered by an external power source, such as a battery or generator, for example. Because the compressor 22 is powered by relatively high-voltage electricity compared to the control interface module 20, the compressor 22 may be located external to the enclosure 12 to minimize the risk of interference between the high voltage of the compressor 22 and the low voltage of the control interface module 20. In alternate embodiments, the compressor may be included within the enclosure, wherein insulation may be utilized to isolate the high voltage of the compressor 22.

The condenser 24 is in fluid communication with the compressor 22, and receives a flow of compressed first heat transfer fluid from the compressor 22 when the compressor 22 is powered on and the first circuit 14 is activated. As shown, the condenser 24 is minimal in size, and is disposed within the air-handling unit 18, as described below. The condenser 24 is in thermal communication with a flow of air 32 through the air-handling unit 18, wherein thermal energy is exchanged between the flow of air 32 and the first heat transfer fluid of the first circuit 14 when the air-handling unit 18 and the first circuit 14 are activated. In the illustrated embodiment the condenser 24 is a multi-pass condenser 24, wherein the first heat transfer fluid is received from the compressor 22 through a first inlet, passes through the condenser 24, and exits to the receiver-drier 26. The first heat transfer fluid is then returned from the receiver-drier 26 to a second inlet of the condenser 24, passes back through the condenser 24, and exits to the expansion valve 28 through a second outlet of the condenser 24. In alternate embodiments, the condenser 24 may be a single-pass condenser 24, wherein the first heat transfer fluid passes from the receiver-drier 26 to the expansion valve 28 without returning to the condenser 24.

The chiller 30 is disposed downstream of the condenser 24 and the expansion valve 28 with respect to the flow of the first heat transfer fluid through the first circuit 14, and receives the first heat transfer fluid from the expansion valve 28. As shown, the chiller 30 is in fluid communication with each of the first circuit 14 and the second circuit 16, and is configured to provide direct thermal communication between the first circuit 14 and the second circuit 16.

From the chiller 30, the first heat transfer fluid is communicated to the compressor 22, thereby completing the first circuit 14.

It will be appreciated by those skilled in the art that the first circuit 14 may include additional components for treatment and control of the first heat transfer fluid, such as filters, regulators, and control valves, for example.

Referring again to FIGS. 1-4, the second circuit 16 includes an inlet 34, a first multi-direction valve 36, a radiator 38, the chiller 30, a coolant reservoir 40, a coolant pump 42, a heater 44, a second multi-direction valve 46, and a plurality of outlets 48 for discharging the second heat transfer fluid from the enclosure 12.

The second circuit 16 is in thermal communication with at least one of the electronic devices 100 of the vehicle through the inlet 34 and the outlets 48. In one embodiment, each of the electronic devices 100 includes a heat sink 50 having a conduit 52 formed therein, wherein the conduit 52 of each of the electronic devices 100 is in fluid communication with the inlet 34 and one of the outlets 48 of the second circuit 16 to facilitate a transfer of thermal energy between the second circuit 16 and each of the electronic devices 100. In alternate embodiments, the second circuit 16 may be in indirect thermal communication with the electronic devices 100 of the system 10, wherein intermediate heat exchangers (not shown) and conduits facilitate a transfer of thermal energy between the electronic devices 100 and the second circuit 16.

The first multi-direction valve 36 is in fluid communication with the inlet 34, and receives a flow of the second heat transfer fluid therefrom. The first multi-direction valve 36 is in fluid communication with each of a first loop 54, a second loop 56, and a third loop 58 of the second circuit 16, and is configured to selectively control a flow of the second heat transfer fluid through each of the first loop 54, the second loop 56, and the third loop 58 based on input from the control interface module 20.

The first loop 54 of the second circuit 16 includes the chiller 30, wherein the second heat transfer fluid is provided to the chiller 30 from the first multi-direction valve 36, and bypasses the radiator 38. As discussed hereinabove, each of the first circuit 14 and the first loop 54 of the second circuit 16 are in fluid communication with the chiller 30, wherein the chiller 30 is configured to provide direct thermal communication between the first circuit 14 and the second circuit 16.

The second loop 56 of the second circuit 16 includes the radiator 38 and bypasses the chiller 30. The radiator 38 is a heat exchanger of minimal size, and is configured to be disposed in the air-handling unit 18, wherein the radiator is in direct thermal communication with the flow of air 32 through the air handling unit 18. In the illustrated embodiment, the radiator 38 is formed separately from the condenser 24 of the first circuit 14, and is spaced downstream of the condenser 24 wherein the flow of the air 32 through the air-handling unit 18 passes through the condenser 24 and the radiator 38 in series. In alternate embodiments, the radiator 38 may be integrally formed with the condenser 24 of the first circuit 14. Alternatively, the radiator 38 may be disposed upstream of the condenser 24. The radiator 38 of the illustrated embodiment is a single-pass heat exchanger.

However, in alternate embodiments the radiator 38 may be a multi-pass heat exchanger, as is known in the art.

The third loop 58 bypasses each of the radiator 38 and the chiller 30, and provides fluid communication of the second heat transfer fluid from the inlet 34 of the second circuit 16 to a portion of the second circuit 16 upstream of the reservoir 40.

In the illustrated embodiment, the first loop 54, the second loop 56, and the third loop 58 each converge upstream of the reservoir 40, wherein each of the first loop 54, the second loop 56, and the third loop 58 share a common portion 60 of the second circuit 16 including the reservoir 40, the pump 42, the heater 44, the second multi-direction valve 46, and the outlets 48. However, in alternate embodiments, the heater 44 may be disposed in a portion of the third loop 58 upstream of the common portion 60, wherein only the third loop 58 of the second circuit 16 includes the heater 44.

As shown, the pump 42 is disposed downstream of the reservoir 40 and upstream of the heater 44, and is configured to circulate the second heat transfer fluid through the second circuit 16. Particularly, the pump 42 draws the second heat transfer fluid from the reservoir 40 to be communicated to the heater 44. In alternate embodiments, the pump 42 may be disposed upstream or downstream of both of the heater 44 and the reservoir 40. As shown, the pump 42 is an electric pump 42. However, it will be appreciated that any type of pump 42 suitable for pumping the second heat transfer fluid may be used. The heater 44 is an electric heater 44 configured to heat the second heat transfer fluid when the heater 44 is powered on.

In the embodiment shown, the second multi-direction valve 46 is downstream of the heater 44, and is configured to selectively control a flow of the second heat transfer fluid to the outlets 48 of the second circuit 16. The second circuit 16 may include a bypass 62 configured to circumvent the second multi-direction valve 46 to provide a continuous flow of the second heat transfer fluid to at least one of the electronic devices 100. For example, the bypass 62 may be in fluid communication with a controller, or other critical electronic devices 100 requiring continuous thermal management.

The air-handling unit 18 of the enclosure 12 includes a housing 64 having an intake 66 for receiving ambient air from outside of the enclosure 12, a conduit 68, and an exhaust 70 in communication with the outside of the enclosure 12. The air-handling unit 18 further includes a variable-speed blower 72 configured to provide the flow of air 32 through the housing 64. It is understood that a constant speed blower can be used if desired. Additionally, other conduits, outlets, dampers, and the like may be used to alter or vary the flow of air 32 through or from the air-handling unit 18. As shown, the condenser 24 of the first circuit 14 and the radiator 38 of the second circuit 16 are each disposed in the conduit 68 of the housing 64, wherein each of the condenser 24 and the radiator 38 is in thermal communication with the flow of air 32 through the housing 64.

The controls interface module 20 is integrated into the system 10 to provide a controller area network (CAN) communication interface with an external controller (not shown) such as a main autonomous systems computer or other control module. The controls interface module 20 controls operation of the first circuit 14, the second circuit 16, and the air-handling unit 18. Particularly, the controls interface module 20 contains communication means and logic to control a speed of the compressor 22, a speed of the pump 42, operation of the multi-direction valves 34, 44, and a speed of the blower 72, as desired. The controls interface module 20 is in communication with a plurality of temperature sensors 74 and pressure sensors 76 on each of the first circuit 14 and the second circuit 16, wherein feedback received from the sensors 74, 76 is relied upon in determining operation of each of the first circuit 14, the second circuit, 16, and the air-handling unit 18.

In use, the system 10 is configured to operate in at least three modes, including a high-cooling mode, a low-cooling mode, and a heating mode.

Figure 2:
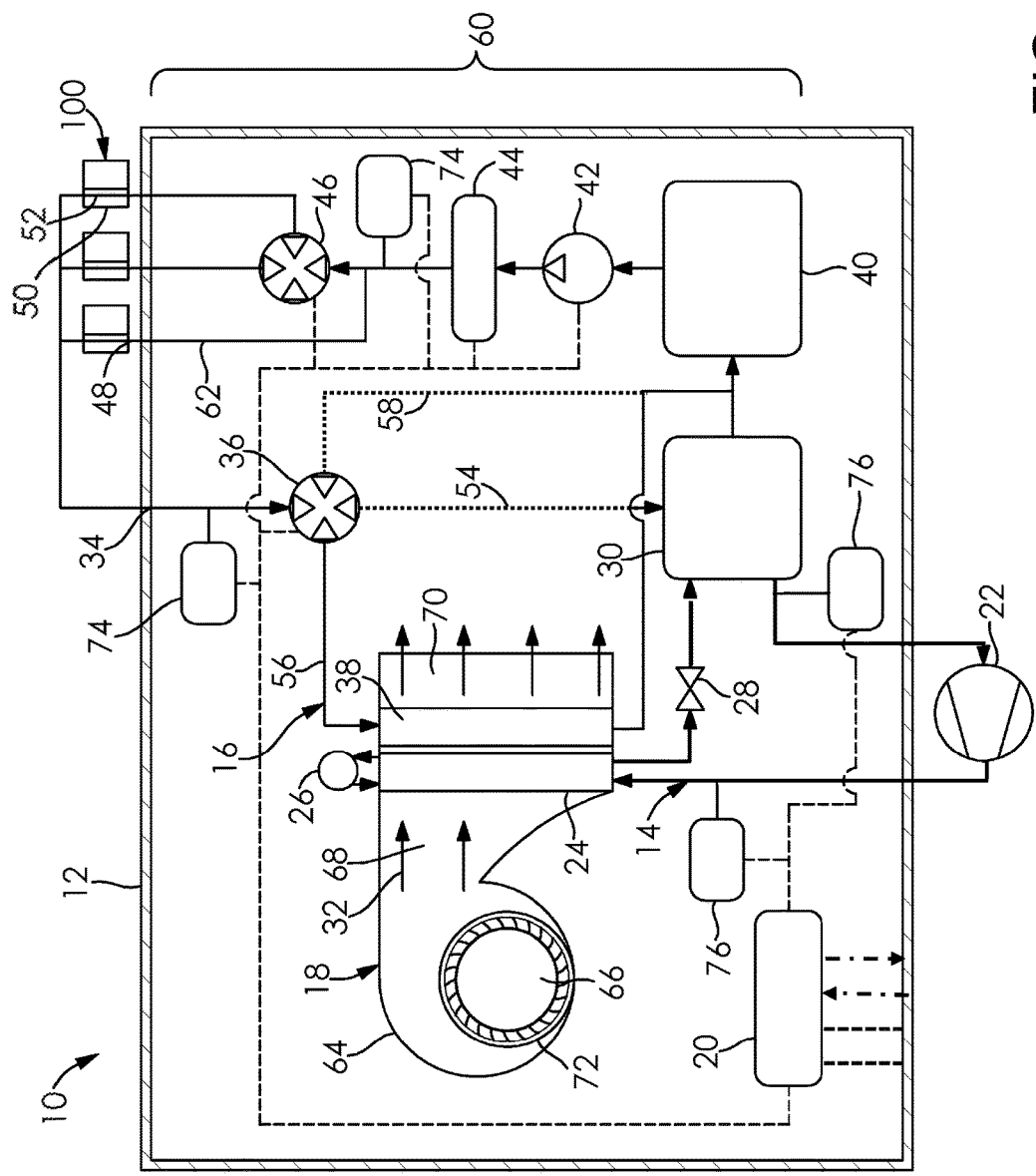
FIG. 2 is a schematic diagram of the system of FIG. 1, wherein the system is configured in a high-cooling mode.

In FIG. 2, the system 10 is shown configured for operation in the high-cooling mode. The system 10 may operate in the high-cooling mode when the required removal rate of thermal energy from the electronic devices 100 needs to be maximized. For example, in periods where an ambient temperature is greater than a desired operating temperature of the electronic devices 100, or when the electronic devices 100 are operating under relatively high operating loads.

In the high-cooling mode, the air-handling unit 18 is activated to provide the flow of air through the housing 64, and particularly, through the condenser 24 and the radiator 38.

The first circuit 14 of the system 10 is also activated, wherein the first heat transfer fluid of the first circuit 14 is circulated therethrough. When the first circuit 14 is activated, a pressure of the first heat transfer fluid passing through the compressor 22 is increased, consequently increasing a temperature of the first heat transfer fluid to a first temperature. The compressed first heat transfer fluid then passes through the condenser 24, wherein thermal energy is transferred from the first heat transfer fluid to the flow of air 32 through the housing 64, thereby cooling the first heat transfer fluid to a second temperature, and heating the flow of air 32, wherein the thermal energy transferred to the flow of air 32 is exhausted from the air-handling unit 18. The first heat transfer fluid then passes through the expansion valve 28, where the pressure of the first heat transfer fluid decreases and the temperature of the first heat transfer fluid decreases to a third temperature. The first heat transfer fluid then passes to the chiller 30.

In the high-cooling mode, the first loop 54 of the second circuit 16 is also opened to allow a flow of the second heat transfer fluid therethrough, while the second loop 56 and the third loop 58 are closed. Generally, the first loop 54 of the second circuit 16 is configured to maximize removal of thermal energy from the electronic devices 100, wherein a flow of heated second heat transfer fluid is received from the electronic devices 100 and passes through the chiller 30 to be cooled by the first heat transfer fluid.

Particularly, the second heat transfer fluid is received by the inlet 34 from the electronic devices 100 and directed through the first loop 54 by the first multi-direction valve 36. In the first loop 54, the second heat transfer fluid passes through the chiller 30. Within the chiller 30, a temperature differential between the third temperature of the first heat transfer fluid and a temperature of second heat transfer fluid causes thermal energy to be transferred from the second heat transfer fluid to the first heat transfer fluid, thereby cooling the second heat transfer fluid. The cooled second heat transfer fluid is then is pumped to the outlets 48 of the second circuit 16 as needed via the pump 42, the second multi-direction valve 46, and the bypass 62. The second heat transfer fluid is then circulated through the respective electronic devices 100, wherein thermal energy is transferred from the electronic devices 100, and returns to the inlet 34, wherein the steps of the high-cooling mode are repeated.

Figure 3:
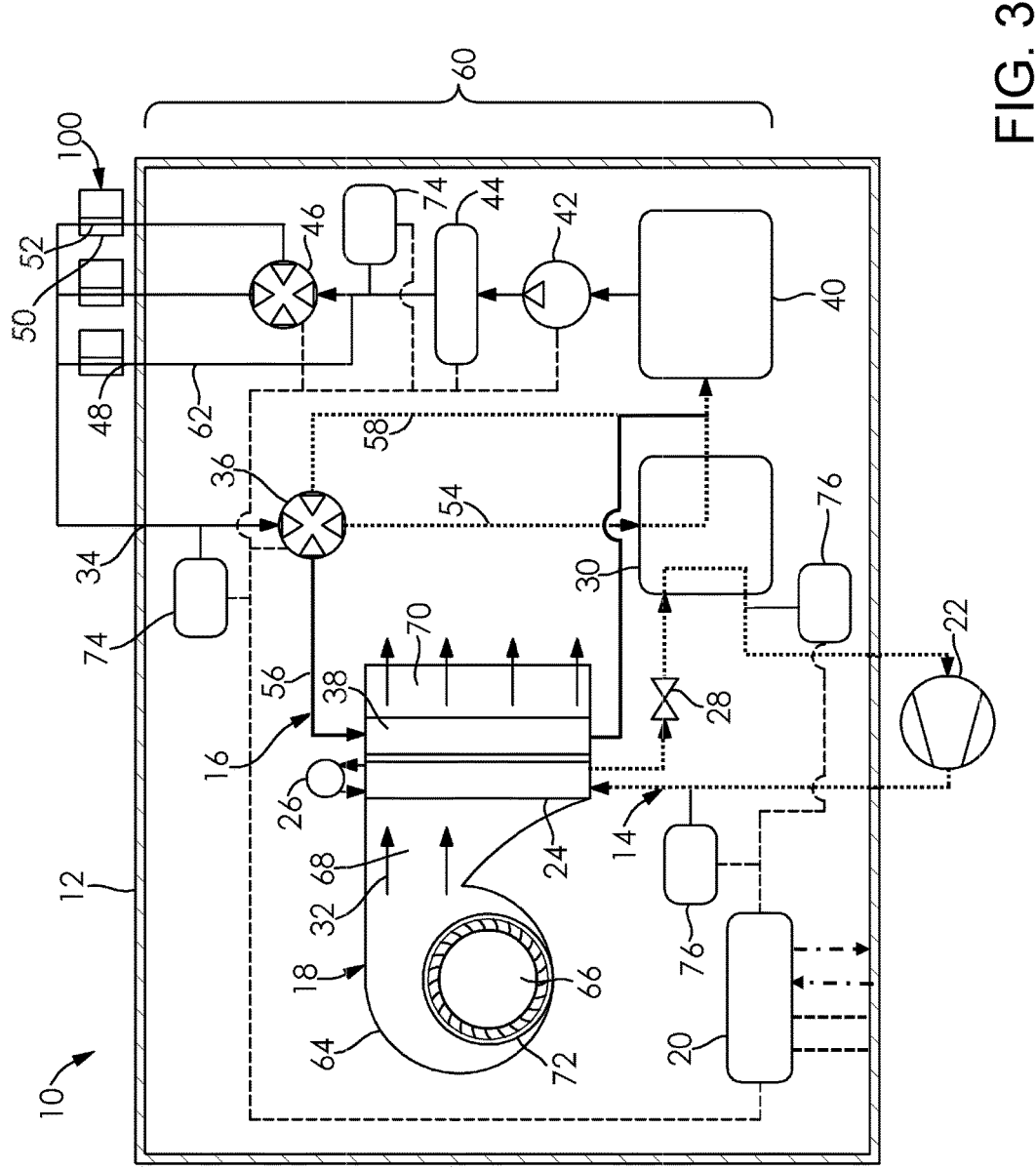
FIG. 3 is a schematic diagram of the system of FIG. 1, wherein the system is configured in a low-cooling mode.

In FIG. 3, the system 10 is shown configured for operation in the low-cooling mode. The system 10 may operate in the low-cooling mode when the required removal rate of thermal energy from the electronic devices 100 is less than the maximized removal rate, as discussed in respect to the high-cooling mode, above. For example, the low-cooling mode may be activated when the electronic devices 100 are functioning under normal operating loads and/or where the ambient temperature is less than or equal to the desired operating temperature of the electronic devices 100.

In the low-cooling mode the air-handling unit 18 is activated as discussed hereinabove with respect to the high-cooling mode. However, unlike the high-cooling mode, in the low-cooling mode the first circuit 14 is deactivated, wherein the first heat transfer fluid is not circulated therethrough.

As shown in FIG. 3, the second loop 56 of the second circuit 16 is opened while the first loop 54 and the third loop 58 are closed. Generally, the second loop 56 of the second circuit 16 is configured to remove thermal energy from the electronic devices 100 at a rate less than the removal rate of the first loop 54, wherein a flow of the second heat transfer fluid is received from the electronic devices 100 and passed through the radiator 38 to transfer thermal energy to the flow of air 32 through the housing 64.

Particularly, the second heat transfer fluid is received by the inlet 34 from the electronic devices 100 and directed through the second loop 56 by the first multi-direction valve 36. In the second loop 56, the second heat transfer fluid passes through the radiator 38, where thermal energy is transferred from the second heat transfer fluid to the flow of air 32 through the air-handling unit 18, and a temperature of the second heat transfer fluid is lowered. From the radiator 38, the second heat transfer fluid flows to the reservoir, and is pumped to the outlets 48 of the second circuit 16 as needed via the pump 42, the second multi-direction valve 46, and the bypass 62.

In the illustrated embodiment, it will be understood that in the high-cooling mode and the low-cooling mode the second heat transfer fluid is pumped through the heater 44 in the common portion 60 of the second circuit 16. However, the heater 44 is deactivated when the system is in the high-cooling mode and the low-cooling mode, and no thermal energy is added to the second heat transfer fluid by the heater 44.

Figure 4:
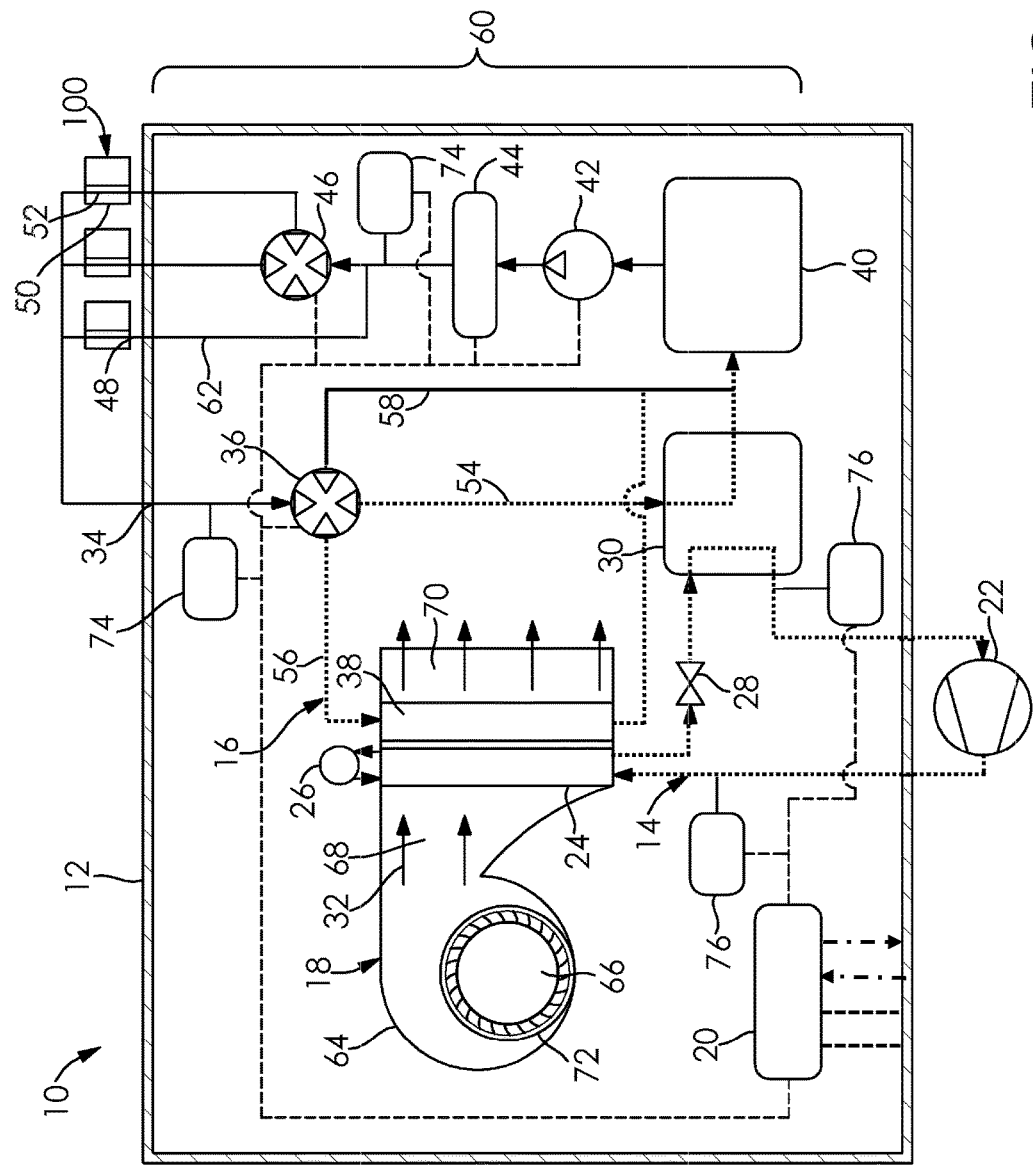
FIG. 4 is a schematic diagram of the system of FIG. 1, wherein the system is configured in a heating mode.

In FIG. 4, the system 10 is shown configured for operation in the heating mode. The system 10 may operate in the heating mode when the ambient temperature is less than the desired operating temperature of the electronic devices 100.

In the heating mode, the air-handling unit 18 and the first circuit 14 are both deactivated, while the third loop 58 of the second circuit 16 is opened and the heater 44 is activated. As shown, each of the first loop 54 and the second loop 56 is closed in the heating mode. Generally, the third loop 58 of the second circuit 16 is configured to add thermal energy to the electronic devices 100 to increase a temperature thereof.

Particularly, the second heat transfer fluid is received by the inlet 34 from the electronic devices 100 and directed through the third loop 58 by the first multi-direction valve 36. In the third loop 58, the second heat transfer fluid received from the inlet 34 of the second circuit 16 bypasses the radiator 38 and the chiller 30 and flows directly to the reservoir 40. From the reservoir 40, the second heat transfer fluid is pumped to the heater 44, wherein thermal energy is added to the second heat transfer fluid to increase the temperature thereof. The second heat transfer fluid then flows to the electronic devices 100 through the outlets 48 of the second circuit 16 via the second multi-direction valve 46 and the bypass 62, wherein the second heat transfer fluid causes a temperature of the electronic devices 100 to increase to the desired operating temperature.

The system 10 of the instant disclosure advantageously provides an integrated, standalone thermal management means for electronic devices in a vehicle, and particularly for an autonomous system for a vehicle. The disclosed configuration allows the system 10 to advantageously operate in the high-cooling mode, the low-cooling mode, or the heating mode depending on the needs of the respective electronic devices 100, without detrimental effects to the primary HVAC system of the vehicle.

Furthermore, including the system 10 in a single enclosure 12 provides improved assembly of the vehicle, as the system 10 can be substantially preassembled prior to vehicle assembly.

From the foregoing description, one ordinarily skilled in the art can easily ascertain the essential characteristics of this invention and, without departing from the spirit and scope thereof, can make various changes and modifications to the invention to adapt it to various usages and conditions.

What is claimed is:

1. A thermal management system for a vehicle comprising:
    an enclosure;
    an air-handling unit disposed in the enclosure, the air-handling unit configured to provide a flow of air;
    a first circuit including a chiller and a condenser disposed within the enclosure, wherein the condenser is in thermal communication with the flow of the air; and
    a second circuit disposed within the enclosure and including a first loop, a second loop, and a third loop, the first loop including the chiller, the second loop including a radiator in thermal communication with the flow of air through the air-handling unit, and the third loop including a heater, wherein the thermal management system is configurable in a high-cooling mode, a low-cooling mode, and a heating mode, and wherein the air-handling unit is activated, the first circuit is activated, and the first loop of the second circuit is open in the high-cooling mode.

2. The thermal management system of claim 1, wherein the second circuit includes at least one electronic device disposed therein, the at least one electronic device in fluid communication with each of the first loop, the second loop, and the third loop.

3. The thermal management system of claim 1, wherein the chiller is configured to provide thermal communication between the first circuit and the second circuit.

4. The thermal management system of claim 1, wherein the first circuit includes a first heat transfer fluid and the second circuit includes a second heat transfer fluid.

5. A thermal management system for a vehicle comprising:
    a first circuit including a condenser disposed within an air-handling unit and a chiller disposed downstream of the condenser with respect to a direction of a flow of a first heat transfer fluid through the first circuit;
    a second circuit including a first loop, a second loop, and a third loop, wherein the first loop includes the chiller and is in thermal communication with the first circuit through the chiller, the second loop including a radiator disposed within the air-handling unit, and the third loop bypassing each of the chiller and the radiator, and wherein a flow through each of the first loop, the second loop, and the third loop is selectively controlled by a first multi-direction valve, and the air-handling unit is configured to provide a flow of air in thermal communication with the condenser and the radiator; and an enclosure, wherein the air-handling unit, the first circuit, and the second circuit are disposed within the enclosure, wherein the thermal management system is configurable in a high-cooling mode, a low-cooling mode, and a heating mode, and wherein the air-handling unit is activated, the first circuit is deactivated, and the second loop of the second circuit is open in the low-cooling mode.

6. The thermal management system of claim 5, wherein each of the first loop, the second loop, and the third loop share a common portion.

7. The thermal management system of claim 6, wherein the common portion includes a reservoir, a pump, the heater, and a second multi-direction valve.

8. The thermal management system of claim 7, wherein the second multi-direction valve is configured to selectively control a flow of a second heat transfer fluid through at least one outlet of the second circuit.

9. The thermal management system of claim 7, wherein the second circuit includes a bypass configured to provide a continuous flow of a second heat transfer fluid to at least one outlet of the second circuit.

10. A thermal management system for a vehicle comprising:

an enclosure;

an air-handling unit disposed in the enclosure, the air-handling unit configured to provide a flow of air;

a first circuit including a chiller and a condenser disposed within the enclosure, wherein the condenser is in thermal communication with the flow of the air; and a second circuit disposed within the enclosure and including a first loop, a second loop, and a third loop, the first loop including the chiller, the second loop including a radiator in thermal communication with the flow of air through the air-handling unit, and the third loop including a heater, wherein the thermal management system is configurable in a high-cooling mode, a low-cooling mode, and a heating mode, and wherein the air-handling unit and the first circuit are deactivated, the third loop of the second circuit is open, and the heater of the third loop is activated in the heating mode.

* * * * *